Figure 1:
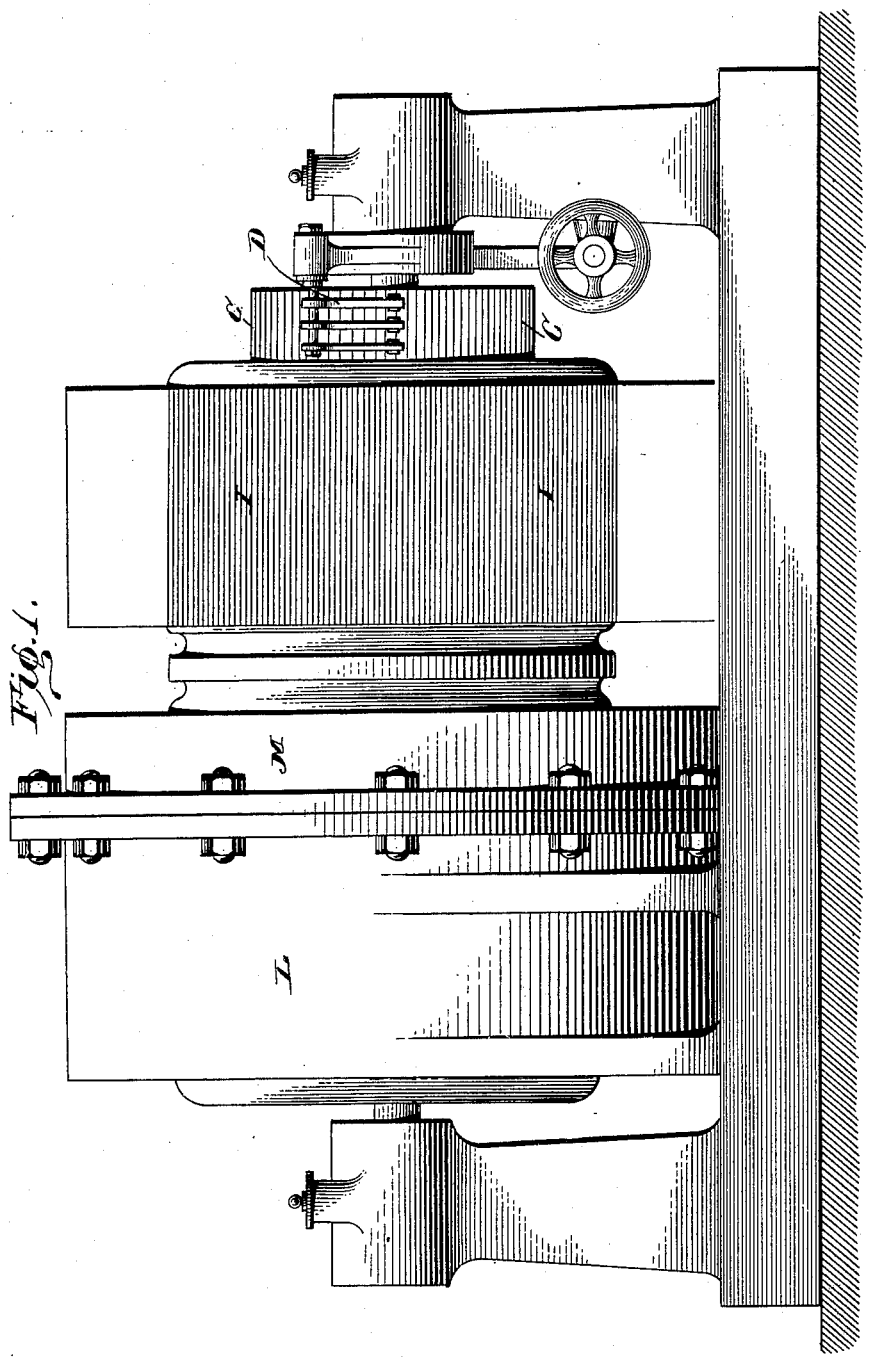

No. 653,089. Patented July 3, 1900.
M. HUTIN & M. LEBLANC.
EXCITER FOR ALTERNATING CURRENT DYNAMO ELECTRIC MACHINES.
(Application filed Nov. 22, 1899.)
(No Model.) 5 Sheets—Sheet 1.

No. 653,089. Patented July 3, 1900.
M. HUTIN & M. LEBLANC.
EXCITER FOR ALTERNATING CURRENT DYNAMO ELECTRIC MACHINES.
(Application filed Nov. 22, 1899.)
(No Model.) 5 Sheets—Sheet 3.

No. 653,089. Patented July 3, 1900.
M. HUTIN & M. LEBLANC.
EXCITER FOR ALTERNATING CURRENT DYNAMO ELECTRIC MACHINES.
(Application filed Nov. 22, 1899.)
(No Model.) 5 Sheets—Sheet 4.

Witnesses:
J. M. Fowler Jr.
F. T. Chapman

Inventors:
Maurice Hutin,
Maurice Leblanc,
By Lyons & Bissing
Attys

No. 653,089. Patented July 3, 1900.
M. HUTIN & M. LEBLANC.
EXCITER FOR ALTERNATING CURRENT DYNAMO ELECTRIC MACHINES.
(Application filed Nov. 22, 1899.)
(No Model.) 5 Sheets—Sheet 5.
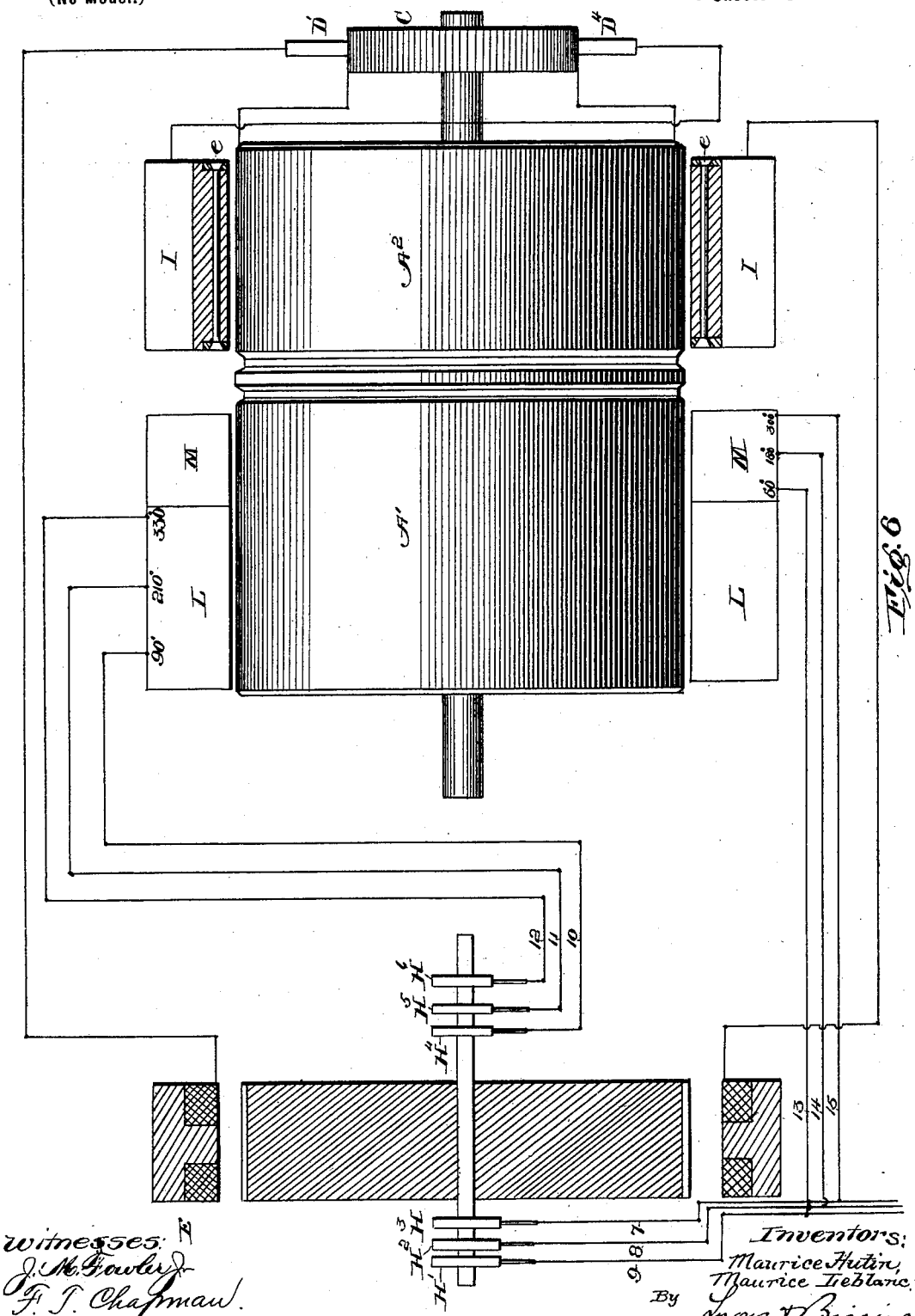

UNITED STATES PATENT OFFICE.

MAURICE HUTIN AND MAURICE LEBLANC, OF PARIS, FRANCE.

EXCITER FOR ALTERNATING-CURRENT DYNAMO-ELECTRIC MACHINES.

SPECIFICATION forming part of Letters Patent No. 653,089, dated July 3, 1900.

Application filed November 22, 1899. Serial No. 737,916. (No model.)

*To all whom it may concern:*

Be it known that we, MAURICE HUTIN and MAURICE LEBLANC, citizens of the Republic of France, and residents of Paris, France, have invented certain new and useful Improvements in Exciters for Alternating-Current Dynamo-Electric Machines, of which the following is a specification.

There has been granted to us a patent, No. 630,233, of the date of August 1, 1899, in which is described and claimed a system of excitation for alternating-current machines of such a nature that the alternating current from the armature-circuits of the alternator are sent into two fields of the exciter, one of these fields being in shunt and the other in series with the alternator-armature. The exciter-fields are so wound and their connections with the armature-circuits of the alternator are so dephased that there is a vector summation of electromotive forces, one of which is proportional to the current strength in the armature of the alternator and the other to the pressure at a predetermined point of the external circuit. The armature-circuit of the exciter under the influence of these two fields feeds currents to the alternator-field. Under these circumstances it was shown in the patent that the alternator is automatically excited under varying loads, so as to maintain a practically-zero difference of phase between the current and the electromotive force in the alternator-armature. The currents which proceed from the armature of the exciter are either continuous, in case the alternator is of the synchronous type and is running in synchronism with the other alternators of the system, or it is slowly alternating in character if the alternator is asynchronous or is running mechanically out of synchronism with the other alternators of the system. In the patent the two exciter-fields are shown as movable, although of course the generic claims covered them when fixed. So, too, as was pointed out in the patent, the action of the exciter-field, which was in shunt of the alternator-armature and which may for convenience be called the "shunt" exciter-field, is of constant intensity and fixed in space with relation to the exciter-brushes when the alternator is of the synchronous type and capable of rotation with relation to the brushes when an asynchronous alternator is to be supplied. On the other hand, the series exciter-field produces a flux which under a condition called the "normal condition" in the patent is at right angles to the shunt exciter-field and which at other times makes an angle therewith equal to the complement of the angle of lag. These two fields—the shunt and series exciter-fields—produce a vector summation of magnetomotive forces, as is readily understood.

In an application for patent filed on April 13, 1899, under Serial No. 712,893, we have shown a system of excitation for an alternator which is similar to the system covered in our Patent No. 630,233, just referred to, but which differs therefrom in adding a driving-field to the two fields already existing in the exciter. In the system of our patent the exciter was driven by mechanical gearing connecting it with the alternator, or by a synchronous motor, which might be called an "electrical" gearing. It was shown in the application Serial No. 712,893 that this mechanical or electrical gearing might be suppressed and that if the driving-field on the exciter were properly arranged the exciter would still run in synchronism with the alternator and yet supply substantially-perfect excitation for the alternator. In other words, the system described in our application Serial No. 712,893 showed that the gearing between the exciter and the alternator of our Patent No. 630,233 might be dispensed with. In our application Serial No. 712,893, however, as in our Patent No. 630,232, both the shunt and series exciter-field windings are shown as movable, although it was recognized to be within the inventions of the patent and application, respectively, to have these field-windings fixed. Now when the series and exciter field windings are movable it is manifestly necessary to employ rings and brushes connected therewith, so that the currents from the alternator-armature may be supplied thereto.

The object of our present invention is to devise an exciter operating according to the inventions of our patent and application just referred to, having the series and shunt exciter-field windings fixed, and thus suppressing or dispensing with the use of the rings and brushes for supplying currents thereto from the alternator-armature and at the same time making it possible in certain cases to dispense with the transformers in the circuits leading from the alternator-armatures to the exciter-field which have been previously used by us.

Figure 2:
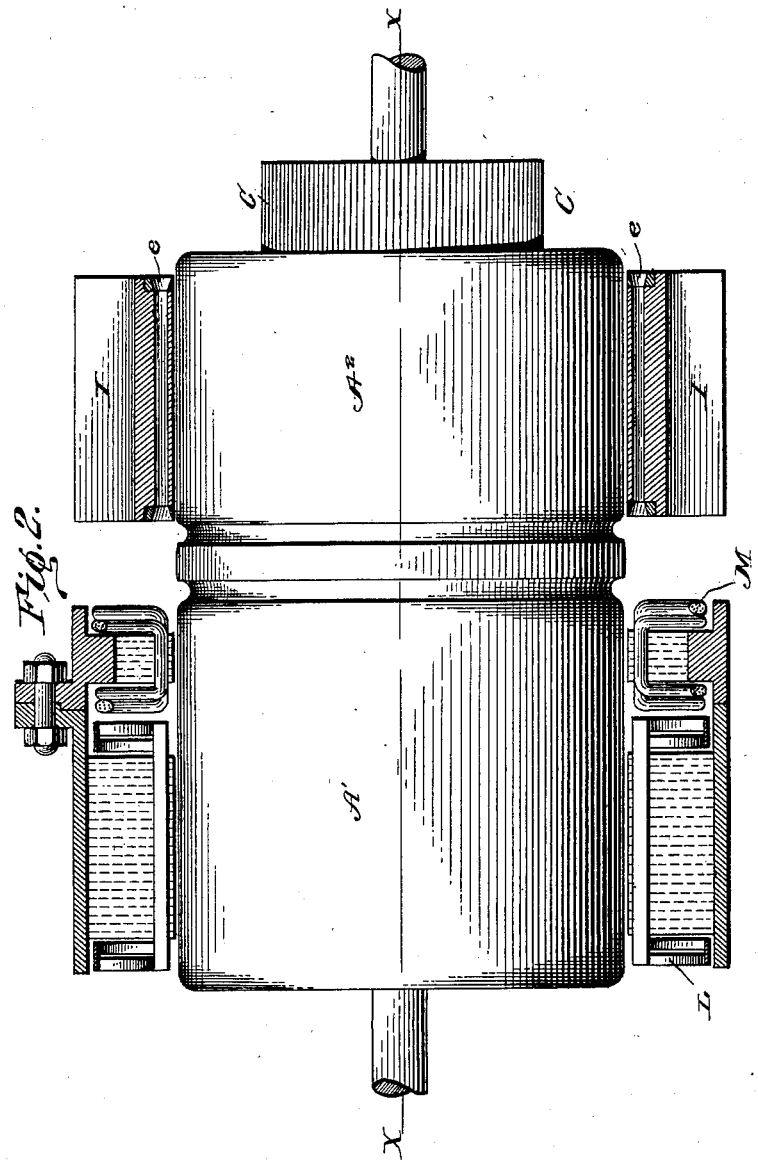
Figure 3:
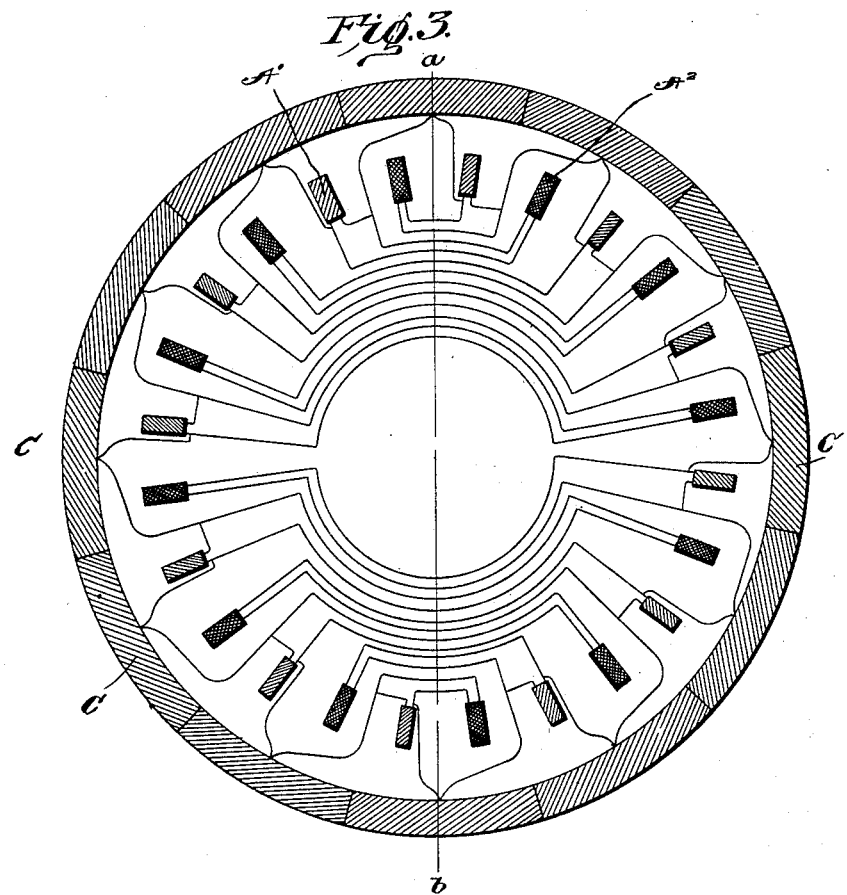
Figure 4:
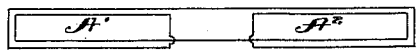
Figure 5:
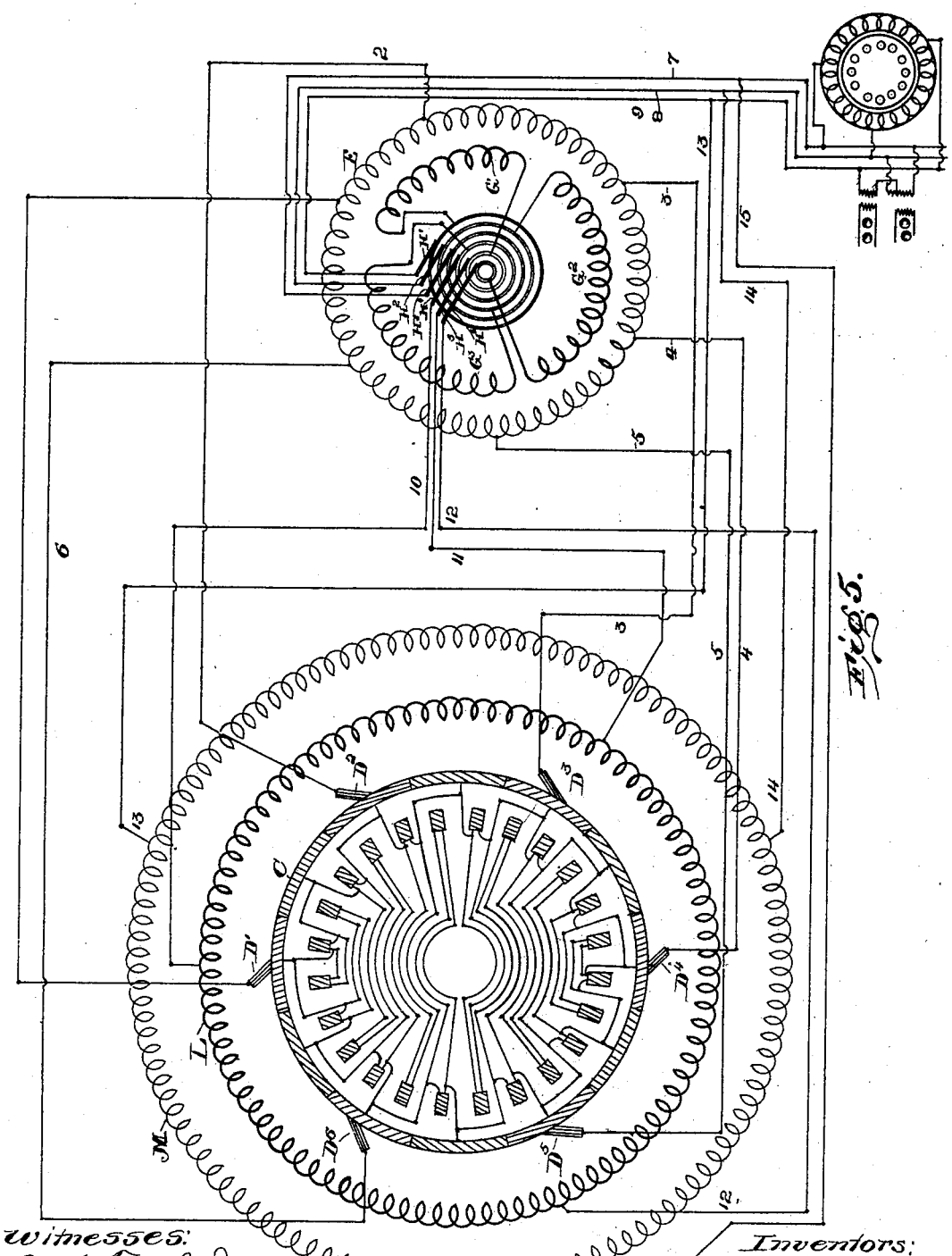

In the drawings, Figure 1 is a side elevation of our exciter. Fig. 2 is a longitudinal section with the central portions in elevation. Fig. 3 is a diagram of the exciter-armature windings. Fig. 4 is a diagram of two connected sections of the exciter-armature windings. Fig. 5 is a diagram of the alternator and exciter connected therewith, the driving exciter-field winding being omitted; and Fig. 6 is another diagram of the exciter and alternator in connection.

The moving part of the exciter is composed of two rings $A'$ $A^2$, like those of a continuous-current machine. The sections of these rings may differ in number and may carry a different number of coils. It is preferable, however, to make the number of sections equal and to have the same number of coils. We shall therefore suppose that this has been done in that which follows. The two rings $A'$ $A^2$ are mounted upon the same axis X. Their sections are, however, connected with each other and with the contacts of a commutator C, mounted on the same axis, to produce what may be aptly described as an "image-winding"—that is to say, a winding in which corresponding sections on the opposite sides of and making equal angles with a plane of symmetry are connected together. This is clearly shown in Fig. 3, where the plane of symmetry is indicated by the letters $a$ $b$ and the commutator-contacts are denoted by C. The sections of the winding $A'$ are indicated by rectangles with parallel hachures and the sections of the winding $A^2$ are indicated by rectangles with crossed hachures. The number of contacts of the commutator is equal to the number of sections in each ring.

An inspection of the diagram shows that each section of the ring $A'$ is mounted in series with that section of the ring $A^2$ which is symmetrical with it with respect to the plane of symmetry $a$ $b$. Each of the resulting sections, which is obtained by connecting in series a pair of sections $A'$ $A^2$ on the opposite sides of the plane of symmetry $a$ $b$, is mounted in derivation or parallel between two consecutive contacts of the commutator, just as if we were connecting the sections of the armature of a continuous-current machine to its commutator.

About the ring $A'$ we dispose two rings carrying windings L M. The circuits of the winding L are connected in series with the corresponding circuits of the alternator-armature. The circuits of the winding M are mounted in shunt of the circuits of the alternator-armature. Again, the circuits L M are dephased with relation to each other in the same manner as the alternating-current circuits L M of the Patent No. 630,233, before referred to. For convenience we have assumed the exciter to be bipolar and the windings L M to be triphase. The exciter may, however, have any number of poles and the windings L M may have any number of phases.

As it is somewhat difficult to show the exact mode of connecting the armature-circuits of the alternator to the field-circuits L M of the exciter in Fig. 6, we have adopted the plan in this figure of indicating the points at which connections are made by marking the angles alongside of their points of entry into the field-rings.

The sections of the magnetic circuits of the rings carrying the windings L M should be made of such size that saturation will be produced in the one or the other of these rings when the voltage of the generator or its load shall have taken a determinate value. This has been fully explained in our Patent No. 630,233. In the present application the object has been attained by making the ring carrying the shunt-winding M smaller than the ring carrying the series-winding L.

Let us assume that the sections $A'$ and $A^2$ are of negligible resistance and, as is the fact, that they have the same number of coils mounted in opposition. This is shown in Fig. 4. If the circuit $A'$ is subjected to the effect of a magnetizing force which engenders in it a variable flux, the circuit $A^2$ will necessarily be the seat of a variable flux which at each instant of time is exactly equal in amount therewith, but of opposite sign thereto. The least difference between the two fluxes will determine an electromotive force in the total circuit, formed by the union of the two circuits $A'$ $A^2$, such that, acting upon a circuit of negligible resistance, there will be generated a wattless current which will necessitate the equality of the two fluxes by diminishing one to augment the other. It follows that to any variable flux developed in the ring carrying the windings $A'$ there corresponds in the ring carrying the winding $A^2$ a flux equal in amount therewith, but of opposite sign thereto, and of which the direction will be symmetrical to that of the first flux with respect to the plane $a$ $b$.

The electrical connections of the exciter and alternator, which are substantially those of the Patent No. 630,233, can readily be followed from Figs. 5 and 6, especially as we have used reference-letters which so far as possible are identical with those of this patent. The alternator-armature carries brushes $H'$ $H^2$ $H^3$ $H^4$ $H^5$ $H^6$. From the first three of these lead the line-wires 9 8 7, from which are tapped the circuits 13, 14, and 15, supplying the exciter-field M. From the last three brushes lead circuits 10, 11, 12 in series with the exciter-field L. The synchronizing field I of the exciter, which acts upon the ring carrying the circuits $A^2$, has its circuit mounted in series with the brushes $D'$ $D^4$, resting on the commutator of the exciter, and these brushes are in turn mounted in series with the field E of the alternator. In case polyphase currents are to be supplied to the alternator-field a number of brushes $D'$ $D^2$ $D^3$ $D^4$ $D^5$ $D^6$, connected to circuits 1 2 3 4 5 6, are employed, as shown in Fig. 5. The armature-windings $G'$ $G^2$ $G^3$ of the alternator are connected to the alternator-brushes through the intervention of rings, as is indicated in Fig. 5.

Let us now assume in the three following paragraphs that the frequency of the currents in the alternator-armature is $\alpha$, that the current-lag of the alternator-armature remains constant, and that the exciter-armature is to supply constant or unidirectional currents to the alternator-field, which means that we are dealing with a synchronous alternator.

It is plain at once that we shall have a flux turning clockwise in space with a velocity of $\alpha$ in the region of the ring $A'$. If now the ring $A'$ and its windings, and therefore its plane of symmetry, is turning clockwise in space with a velocity of $\frac{\alpha}{2}$, so that the flux is turning clockwise with respect to the plane of symmetry of the ring $A'$ with a velocity of $\frac{\alpha}{2}$, then the flux engendered in the ring $A^2$ is rotating counter-clockwise with respect to this plane of symmetry at a velocity of $\frac{\alpha}{2}$, and is therefore fixed in space.

Under these conditions the current taken from the brushes resting on the commutator C will be unidirectional and constant. The currents supplied to the field I of the exciter will be unidirectional and constant, and this field will therefore act as a synchronizing field for the windings on the ring $A^2$. Furthermore, the current supplied to the alternator-field E will be unidirectional and constant and of an amount exactly equal to that required for perfect excitation, since it has been produced by the action of the two field-windings L M, which, to all intents and purposes, are arranged and wound as the corresponding field-windings of our Patent No. 630,233, and which have, through the intervention of the windings $A'$, an effect on the windings $A^2$ precisely the same as that which the movable field-windings L M of the Patent No. 630,233 had on the armature-circuit A.

The effect of the rotary field caused by the currents of frequency $\alpha$ in the shunt-winding M in the region of the ring $A'$ is to produce a field in the ring $A^2$ which is fixed in space. This is due to the counter-rotation produced by the image-winding, as has been just explained. It is also due to the fact that the shunt-winding M is energized by currents the electromotive forces producing which are constant and in step with the currents produced by them, so that the field produced by the shunt-winding M in the region of the ring $A'$ is rotating uniformly at the velocity of synchronism. So long then as the current-lag of the alternator is constant, which means that the phase of the current in the series winding L makes a constant angle with the phase of the current in the shunt-winding M, it is plain that the result of these two windings is to produce a flux in the ring $A^2$ which is fixed in space.

Let us now assume that the current-lag in the armature of the alternator suddenly changes. This means that the field produced by the winding L makes a different angle with the field produced by the winding M than it did before. The effect of this is to suddenly change the direction of the resultant field, due to the two windings L and M, with respect to the plane of symmetry—that is to say, this resultant field is shifted with respect to the plane of symmetry by an amount greater than that called for by the uniform rotation of the field M. If, for instance, the resultant field due to the two stationary windings L and M is suddenly shifted clockwise ten degrees with respect to the plane of symmetry $a\ b$, this shifting of ten degrees being something in addition to the normal shift which is constantly taking place by reason of the uniform rotation of the field M, then it is plain that the stationary field produced in the ring $A^2$ is shifted counter-clockwise with respect to the plane of symmetry. If the stationary field in the winding $A^2$ was originally vertical, it will now be ten degrees to the left of the vertical. So long then as it is a question of supplying the field of a synchronous alternator with unidirectional currents it is clear that the conditions which prevail in the exciter of the present application are substantially those found in our Patent No. 630,233, where, it will be remembered, the result of the shunt-winding M in the exciter was to produce a field of constant intensity and fixed in space and the action of the series winding L was to shift the direction of this flux, which was fixed in space, as the angle of lag varied. The compounding due to the windings L M of this application is precisely that produced by the windings L M of the patent just mentioned; but it is equally manifest that the exciter of the present application will act as did the exciter of the patent referred to when the alternator is asynchronous. The only difference will be that we shall have to employ a plurality of exciting-circuits and a corresponding number of brushes on the exciter-commutator. We have seen in synchronous alternators if the exciter-fields are supplied with alternating currents of the frequency produced by the alternator-armature to which they are connected and are driven in synchronism with those currents the resultant flux in the exciter is fixed in space and the exciter supplies continuous current to the alternator-field. In precisely the same way it is seen that if the speed of rotation of the exciter or the frequency of the alternating current supplied thereto is changed the resultant flux in the exciter rotates slowly and alternating currents of low frequency are supplied to the alternator-field, which then acts as an asynchronous alternator.

The exciter in this application, as in the Patent No. 630,233, may be bipolar or multipolar. If the alternator is uniphase, the winding M is uniphase. In this case the squirrel-cage magnetic screen e will be employed to suppress one of the two rotating fields into which the monophase current is decomposed, as is well understood. If the alternator is polyphase, the winding M is polyphase. If the alternator is synchronous and has but a single field-exciting circuit, a single pair of brushes is employed on the exciter-commutator. If the machine be asynchronous with a plurality of exciting-circuits, a corresponding number of brushes are employed on the exciter-commutator. It is also clear that the exciter of this application has the property of the exciter of our Patent No. 630,233, which is described on page 6, lines 19 to 78, of the patent, and which, briefly stated, amounts to this: that if the alternator supplied by the exciter is once brought up to speed and put in synchronous relation with a number of alternators of the system then it will stay in synchronous relation therewith and will not fall out of step. In a word, the exciter of the present application operates as did the exciter of our patent.

As we have before stated, we designate as an "image-winding" any winding by means of which a field rotating in one direction in one section of the winding is converted into a field rotating in the other direction in another section of the winding. It is also seen that the winding L is a stationary means for creating a rotary field varying in magnitude and phase with the variations in volume and phase of the currents supplied by the alternator, just as the winding M is a stationary means for creating a rotary field of constant magnitude. Put in another way, one of these windings produces a practical constant field and the other produces a field variable with the current in the armature of the alternator.

What we claim is—

1. An exciter comprising series and shunt fields, an armature having an image-winding connected to a commutator, with one of its sections under the influence of these fields, and a field in series with the brushes on the commutator acting on the other section, substantially as described.

2. An exciter comprising dephased series and shunt fields, an armature having an image-winding connected to a commutator with one of its sections under the influence of these dephased fields, and a field in series with the brushes on the commutator acting on the other section, substantially as described.

3. An exciter comprising multiphase, dephased series and shunt fields, an armature having an image-winding connected to a commutator with one of its sections under the influence of these multiphase fields, and a field in series with the brushes on the commutator acting on the other section, substantially as described.

4. An exciter for an alternator comprising in combination stationary means for creating a rotary field of constant magnitude, stationary means for creating a rotary field varying in magnitude and phase with the variations in volume and phase of the current supplied by the alternator and an armature-winding in the inductive influence of both fields, substantially as described.

5. The combination with an alternator, of an exciter comprising a stationary series winding producing a field varying with the load on the alternator, a stationary shunt-winding producing a constant field, an armature-winding in inductive relation with the two stationary windings, a commutator connected to said armature-winding and brushes thereon connected with the alternator-field, substantially as described.

6. The combination with an alternator, of an exciter driven in synchronous relation therewith, the exciter having two stationary field-windings, one of which is in series with the armature of the alternator and the other in shunt therefrom, substantially as described.

7. The combination with an alternator, of an exciter driven in synchronous relation therewith, the exciter having two stationary field-windings, one of which is in series with the armature of the alternator and the other in shunt therefrom, a commutator connected to the exciter-armature and brushes bearing thereon connected to the alternator-field, substantially as described.

8. The combination with an alternator, of an exciter driven in synchronous relation therewith, the exciter having two stationary field-windings, one of which produces a practically-constant field and the other of which produces a field variable with the current in the armature of the alternator and an armature-winding in inductive relation to both exciter-fields for supplying the alternator-field, substantially as described.

9. The combination of an alternator, and an exciter comprising series and shunt fields, an armature having an image-winding connected to a commutator, with one of its sections under the influence of both fields, a field in series with the brushes on the commutator acting on the other section of the image-winding and electrical connections between the commutator-brushes and alternator-field, substantially as described.

10. The combination with an alternator, and an exciter comprising dephased series and shunt fields, an armature having an image-winding connected to a commutator with one of its sections under the influence of these dephased fields, a field in series with the brushes on the commutator acting on the other section of the image-winding and electrical connections between the brushes and alternator-field, substantially as described.

11. The combination of a polyphase alternator, and an exciter comprising multiphase, dephased series and shunt fields, an armature having an image-winding connected to a commutator with one of its sections under the influence of the multiphase fields, a field in series with the brushes on the commutator acting on the other section of the image-winding and electrical connections between the brushes and alternator-field, substantially as described.

12. The combination of an alternator and an exciter comprising stationary means for creating a rotary field of constant magnitude, stationary means for creating a rotary field varying in magnitude and phase with the variations in volume and phase of the current supplied by the alternator, and an armature-winding in the inductive influence of both fields for supplying current to the alternator-field, substantially as described.

13. The combination of an alternator and an exciter comprising stationary field-windings connected respectively in series and shunt with the alternator-armature circuits and in dephased relation with each other, an exciter-armature having an image-winding by means of which the field caused to rotate in space in the region of one of its sections by the series and shunt windings is converted into a field stationary in space in the region of its other section, but varying in direction in accordance with the variations of the current in the series winding and electrical connections between the exciter-armature and the alternator-field, substantially as described.

In testimony whereof we have signed our names to this specification in the presence of two subscribing witnesses.

MAURICE HUTIN.
MAURICE LEBLANC.

Witnesses:
ALBERT PELAS,
EDWARD P. MACLEAN.